United States Patent [19]

Piontkowski

[11] Patent Number: 4,827,852
[45] Date of Patent: May 9, 1989

[54] CATALYTIC WOOD STOVE

[76] Inventor: Carl F. Piontkowski, 38 Ridge Dr., Old Saybrook, Conn. 06475

[21] Appl. No.: 56,962

[22] Filed: Jun. 1, 1987

Related U.S. Application Data

[63] Continuation of Ser. No. 391,491, June 24, 1982, abandoned.

[51] Int. Cl.$^4$ ............................................. B01D 53/36
[52] U.S. Cl. .................................. 110/211; 110/203; 126/289; 422/177; 431/268
[58] Field of Search ............... 422/115, 177, 180, 200; 110/203, 210, 211, 214, 119, 213; 126/77, 80, 289; 431/171, 268, 273; 423/210

[56] References Cited

U.S. PATENT DOCUMENTS

| | | | |
|---|---|---|---|
| 1,738,184 | 12/1929 | Holder | 431/171 |
| 2,381,803 | 8/1945 | Breault | 431/171 |
| 3,065,595 | 11/1962 | Gary | 422/177 X |
| 3,785,778 | 1/1974 | Burstein et al. | 422/180 X |
| 3,910,770 | 10/1975 | Kobylinksi et al. | 422/180 X |
| 4,054,418 | 10/1977 | Miller et al. | 110/203 X |
| 4,319,556 | 3/1982 | Schwartz et al. | 126/77 |
| 4,330,503 | 5/1982 | Allaire et al. | 126/289 X |
| 4,373,452 | 2/1983 | Van Dewoestine | 422/177 X |
| 4,373,507 | 2/1983 | Schwartz et al. | 126/289 |
| 4,479,921 | 10/1984 | Allaire et al. | 126/77 X |
| 4,582,045 | 4/1986 | Dorau et al. | 126/77 X |

OTHER PUBLICATIONS

Shelton, J. W.; "Catalytically Assisted Combustion in Residential Wood-Fueled Heating Appliances;" Feb. 21, 1981; Shelton Energy Research.
Zimar et al.; "Catalytic Combustion in Residential Wood Stoves"; Feb. 23, 1981; Corning Glass Works.
Noll, F. E.; "Catalytic Wood Stoves Utilizing the Corning Wood Stove Combustor", Jan. 1982; Corning Glass Works.

Primary Examiner—Richard L. Chiesa
Attorney, Agent, or Firm—Fishman, Dionne & Cantor

[57] ABSTRACT

A catalytic combustor wood stove is presented having a combustor ignitor plate which promotes turbulence and mixing of combustion gases with air from a distributed primary air supply to deliver thoroughly mixed gas to the catalytic combustor to light off the combustor at low firebox temperature (in the range of 400° to 500° F.) but operate the combustor at high temperature on the order of 1000° F. to 1200° F. or higher.

18 Claims, 2 Drawing Sheets

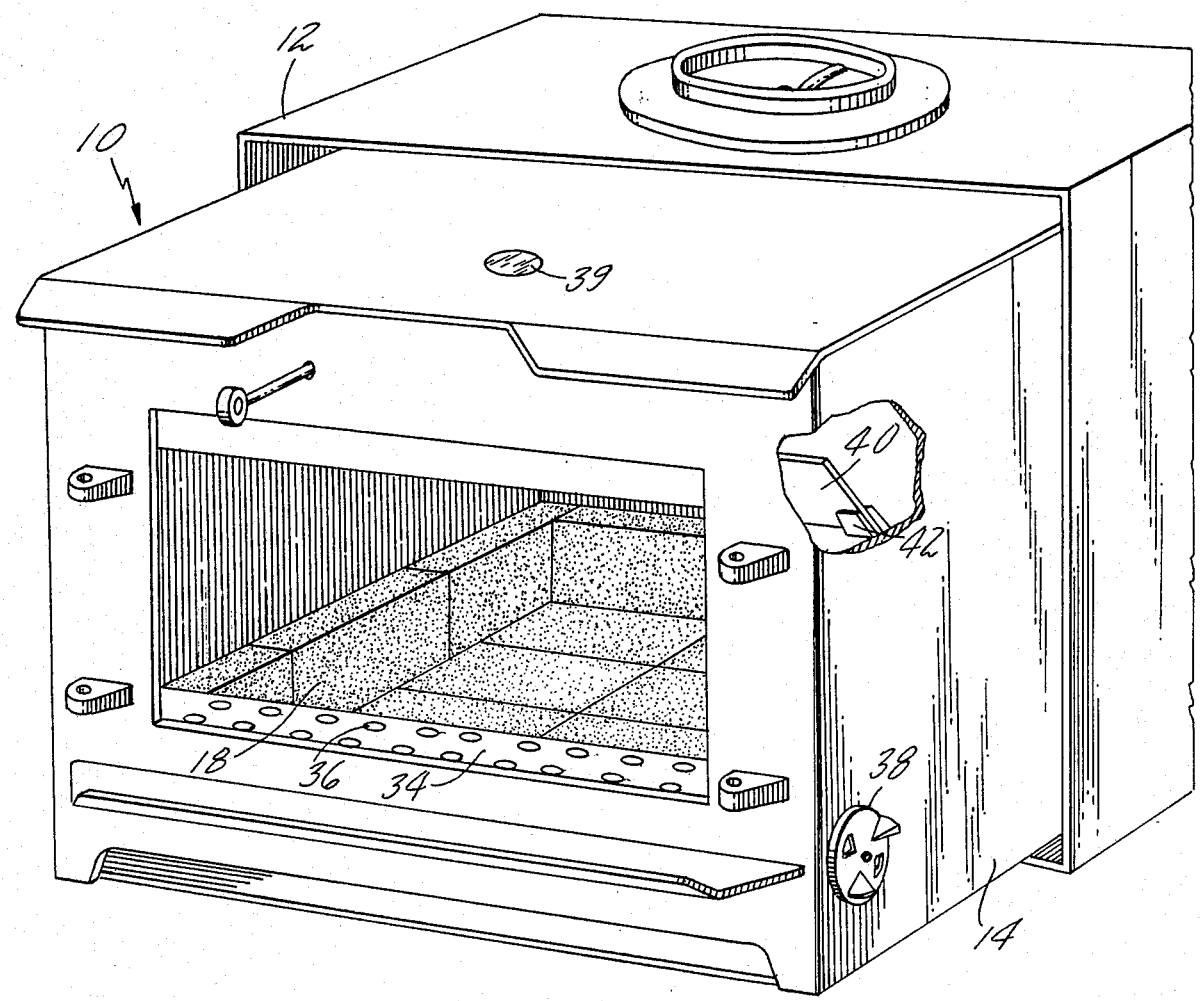

CATALYTIC WOOD STOVE

This application is a continuation of application Ser. No. 391,491, filed June 24, 1982, now abandoned.

BACKGROUND OF THE INVENTION

This invention relates to the field of wood burning stoves. More particularly, this invention relates to wood burning stoves incorporating a catalytic combuster for combustion (oxidation) of unburned components (typically carbon monoxide and hydrocarbons) normally present in exhaust smoke.

The use of catalytic combustors is a fairly recent development in the field of wood burning stoves. Catalytic combustors have been incorporated in a number of wood burning stoves sold commercially; and the subject of catalytic combustors has been discussed in various papers, such as the paper entitled "Catalytically Assisted Combustion In Residential Wood-Fueled Heating Appliances" and "Catalytic Combustion In Residential Wood Stoves" presented respectively by J. W. Shelton and R. V. Van Dewoestine at the E.P.A. conducted conference on Wood Combustion Environmental Assessment held in cooperation with The Wood Heating Alliance 1981 International Trade Show and Wood Heating Seminar in New Orleans, La., Feb. 21–24, 1981 and the paper entitled "Catalytic Wood Stoves Utilizing The Corning Wood Stove Combustor (Operation and Design)", January 1982 by F. E. Noll.

It has been known in the field of wood burning stoves that a considerable amount, perhaps as much as 30%, of the chemical energy available from wood fuel leaves a typical wood stove unburned as smoke. This creates not only air pollution problems, but also results in the build up of creosote inside the chimney or the connector from the stove to the chimney. The escape of unburned combustibles is both an economic problem (the cost of heating is increased) and an air pollution problem (which has the potential of becoming of serious magnitude with the increased use of wood burning stoves). The problem of creosote build up is of concern because it can result in dangerous chimney fires, and the creosote can cause corrosion in chimney systems and can create odor problems.

The use of catalytic combustors in wood stoves, as has been proposed in the past, offers the theoretical potential advantages of increases in energy efficiency of the stoves, reduction in pollution, and reduction in creosote build up problems. However, despite apparent indications to the contrary in some literature, practical experience with catalytic combustors has shown the existence of several problems. Practice has shown that high primary combustion flame temperature in the firebox and direct impingement of the flame on the combustor is required in order to fire off the combustor and keep it in full operation. If the primary combustion flame temperature has not been very high and did not impinge directly on the catalytic combustor then the catalytic combustor will not ignite or will not function properly. The direct impingement of high temperature flame heretofore required to light off the catalytic combustor resulted in thermal shock to the combustor, also contributed to burn out of the combustor and high fuel consumption to generate the necessary primary flame temperature to set off the combustor. As a result, combustors (which are expensive) typically burn out or disintegrate in less than one season. This has led to schemes such as flame shields (a metal plate) in front of the combustor to protect against flame impingement; but such shields are counterproductive in that they make it more difficult to light off the combustor. Also, to combat disintegration, elaborate "canning" schemes have been proposed to encase the combustor in a metal case.

Conventional prior art practice for use of catalytic combustors has also required the use of secondary airflow delivered to the catalytic combustor. The secondary air has been necessary in prior systems in order to have sufficient oxygen for combustion in the combustor. However, it is known that secondary airflow can be counterproductive in that too much secondary airflow can quench the catalytic combustor. Furthermore, the secondary air is at a lower temperature than combustion gases, thus aggravating the problem of developing a sufficiently high temperature to set off the combustor.

Summary of the Invention

The above discussed and other problems of the prior art are reduced or overcome by the present invention which produces a more optimized catalytic combustor stove structure than heretofore known. In accordance with the present invention, a combustor ignitor plate is disposed in the firebox in the vicinity of the combustor. The combustor ignitor plate is positioned in the path of gas and airflow to the combustor and is spaced from the combustor. The combustor ignitor plate defines an air space above the plate between the plate and the combustor and functions to create one or more zones of high turbulence and mixing of combustion gases from the primary burning of the wood and oxygen from the primary air supply to both the main volume of the firebox and at the entrance to the combustor to produce a thoroughly mixed gas which is delivered to the combustor with sufficient amounts of primary air oxygen for combustion.

The present invention also incorporates a manifold plate across the front of the stove to deliver the primary air supply to the stove in a screen flow across the front of the stove. This primary airflow serves to feed the primary combustion of the wood in the stove, may also form a secondary burning zone in the nature of a standing flame, and delivers unburned oxygen to the combustor ignitor plate for thorough mixing with the primary combustion gases for delivery to the catalytic combustor.

Tests of a stove built in accordance with the present invention have shown that the catalytic combustor of a conventional prior art type will be fired or set off at low firebox temperatures without direct impingement of the flame and almost simultaneously with the initiation of primary wood burning in the stove, and the catalytic combustor operates continuously along with normal primary wood combustion in the stove. Significantly, primary airflow can be greatly cut back to reduce primary wood combustion to almost a smoldering state; and yet the combustor will operate at increased temperatures to burn essentially all of the combustibles in the smoke at a high temperature in the combustor. Thus, fuel consumption can be significantly reduced while maximum available energy is useably extracted from the fuel.

BRIEF DESCRIPTION OF THE DRAWINGS:

Referring now to the drawings, wherein like elements are numbered alike in the several FIGURES:

FIG. 3 is a partial perspective view of the stove of the present invention with the front doors removed and the side partially segmented to show the combustion ignitor plate and airflow manifold of the present invention.

DESCRIPTION OF THE PREFERRED EMBODIMENT

Figure 1:
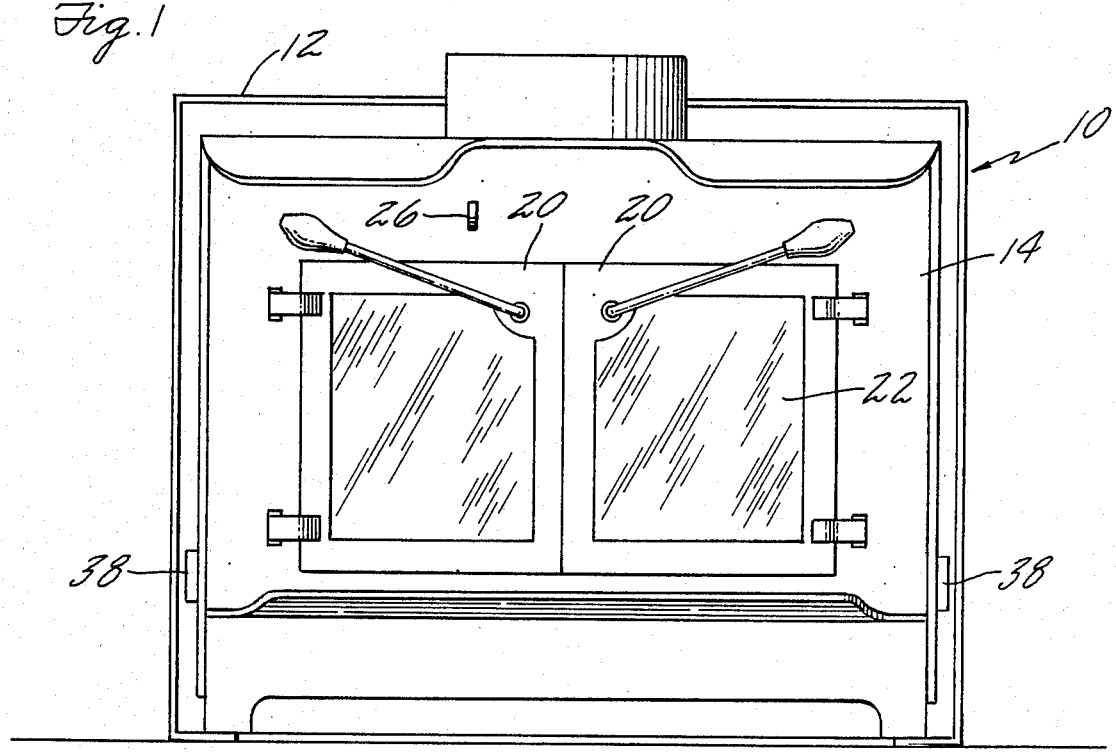
FIG. 1 is a front elevation view of a wood burning stove incorporating the present invention.

Referring to the three FIGURES jointly, a stove 10 of the fireplace insert type is shown, although it will, of course, be understood that the invention is equally applicable to free standing stoves. Stove 10 has an insert frame or box 12 which is intended to fit into the opening of a fireplace, the front opening of which would then be sealed off by a face or cover plate (not shown) attached to the front of insert 12. Stove 10 has a generally cubicle firebox 10 which defines an interior combustion space 16 in which the wood charge is placed for burning. The bottom interior of firebox 14 is lined with refractory brick 18 in the customary manner, and the wood load to be burned would be placed on the brick (on a raised grate if desired). The stove has a pair of pivotally connected doors 20 which may have glass windows 22. The doors have been removed from FIG. 3 for purposes of clearer illustration of the interior of the firebox. The stove also has a bypass damper 24 operated by a projecting operating handle 26 and a flue damper 28 also operated by a projecting operating handle 30. The stove structure described immediately above in this paragraph is a conventional fireplace stove, and it is described for the purposes of setting the environment for the present invention.

Figure 2:
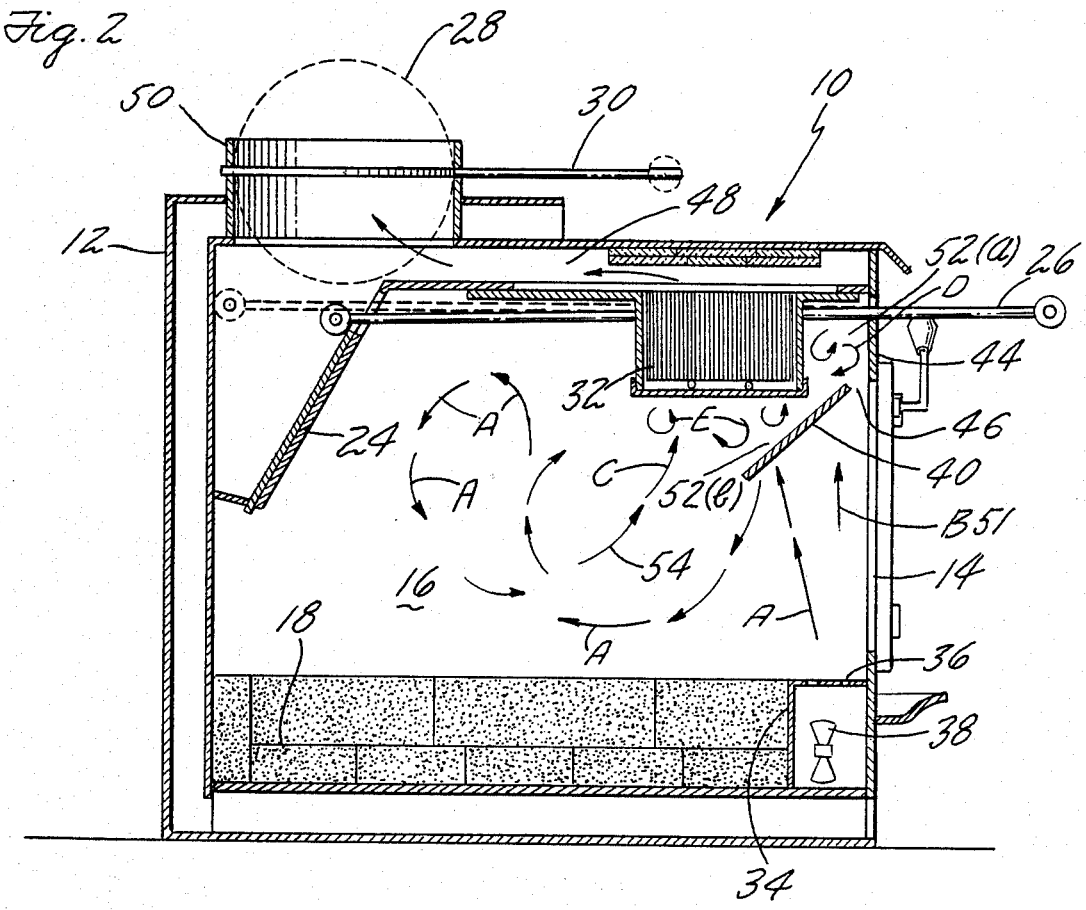
FIG. 2 is a sectional side elevation view of the stove of FIG. 1.

A catalytic combustor 32 is positioned in the stove toward the front of the firebox, as best shown in FIG. 2. This catalytic combustor may be any catalytic combustor known in the art, such as, for example, a one piece cellular ceramic honeycomb unit made of Corning Celcor Code 9475 Cordierite coated with a Noble metal catalyst of the platinum metal family. This combustor is available from Corning Glass Works, Corning, N.Y. The combustor is mounted in the stove and held in place in accordance with known techniques for mounting this catalytic combustor. In the preferred embodiment of this invention, a screen is placed in front of the entrance to the combustor to act as a filter to prevent paper particles, etc. from entering and physically clogging combustor passages. However, a flame shield located below the combustor to protect it from direct flame impingement from the primary combustion flame in the firebox (as suggested in the prior art) is not needed, because the usual direct flame impingement is not encountered.

In accordance with the present invention, a combustor ignitor plate and a primary air delivery system are included in the stove and provide extremely unexpected and improved results in operation. The primary air supply system includes an air supply manifold box or tube 34 with an array of spaced airflow holes 36 distributed along the length of the manifold. Manifold 34 is positioned across the width of the stove immediately inside the front door area. Manifold box 34 communicates with a primary air draft control valve 38 (there being one each of the drafts 38 at each side of the firebox). Drafts 38 communicate directly with the hollow interior of manifold 34, and the drafts may be manually adjusted to control airflow. A sight glass 39 may be provided to view combustor 32.

The present invention also incorporates as its key element a combustor ignitor plate 40 which cooperates and interacts principally with catalytic combustor 32 and possibly also with the primary air supply from manifold 34 to produce totally surprising and unexpected results. Plate 40 extends between the sides of the firebox along substantially the entire front width of the firebox and it may be removably mounted in a friction clamp bracket 42 adjacent to each side of the stove (or it could be an integral part of the stove). It is preferred that the plate 40 extend the full front width of the stove for optimum performance, but a lesser width of the plate may also produce acceptable improvement in operation of the stove. As can best be seen from a combined consideration of FIGS. 2 and 3, plate 40 is positioned at an angle to the vertical axis of combustor 32 and extends from a position (starting at the left as shown in FIG. 2) beneath the combustor and behind the frontmost portion of the combustor to the right to a position above the bottom of the combustor and forward of the frontmost portion of the combustor. Thus, plate 40 overlaps a portion of that part of the combustor into which the combustion gases flow and extends beyond the combustor toward the front of the stove above where the primary airflow enters the stove. While the exact configuration shown in FIGS. 2 and 3 may not be the only operable arrangement, it is believed to be important that the combustor ignitor plate 40 be in a position where it both overlaps the combustor to project into the gas stream flowing into the combustor and also extends into the primary airflow of air entering the firebox to deflect the major portion of primary air in a swirling and turbulent pattern into the main fire portion of the firebox (i.e., that portion where the wood to be burned is located). It is also important to insure airflow above plate 40 into the space 52(a), either by an airflow space 46 defined between the forwardmost edge of plate 40 and the front wall 44 of the firebox or airflow passages in plate 40 or otherwise. It is believed that airflow in space 52(a) plays an important part in the success of the present invention, probably by providing a warm unburned air supply for the combustion gases at the entrance to the combustor.

In the operation of the stove of the present invention, primary air is introduced into the firebox through drafts 38 and manifold 34 through the manifold holes 36. The major portion of this primary air flows upward (arrow A) to the plate 40 and is deflected back down by plate 40 to form a swirling and turbulent air flow (a main mixing zone) for the main burning portion of the firebox, as indicated by the arrows A to feed and support combustion of a wood load (not shown) located in the firebox. Bypass damper 24 is closed during normal operation of the stove, so the gaseous products of combustion from the burning wood in the stove flow through the honeycomb passage structure of combustor 32 and are then delivered via flow passage 48 to exhaust stack 50 which is connected to a chimney or other suitable exhaust structure. While all of the reasons and details are not fully understood at this time, tests of the present invention have shown that the presence of combustor ignitor plate 40 produces ignition or light off of the combustor almost immediately upon the beginning of wood burning in the stove and at the relatively low temperatures of normal primary combustion in the stove and without direct flame impingement on the combustor. While the reasons are not fully understood, it is theorized that the airflow from manifold 34, in addition to delivering air to support combustion in the center of the firebox, sets up a screen of air B which washes the interior of the front wall of the firebox and moves toward the top of the firebox. This air stream, it is theorized, flows through airflow space 46 and into what may be referred to as second mixing or turbulence spaces or zones 52(a) and 52(b). Zone 52(a) is defined by the cooperation of plate 40 and combustor 32 and the stove walls at the top front of the stove while zone 52(b) is between the plate 40 and the entrance to the combustor. Simultaneously, the gases of combustion, which contain large amounts of unburned combustible products flow, as generally indicated by arrows C, toward the bottom of the combustor to enter the combustor. While the causes and reasons are not fully understood, it appears that the structure of the present invention results in significant turbulence and mixing in zones 52(a) and/or 52(b) (perhaps much in the nature of the effects of an automobile carburetor) of the combustion gases from the fire and the primary air from air flow B flowing along the front of the stove into space 52(a). In one way or another, the structure produces significant turbulence and mixing (as indicated by the small circularly shaped arrows D and E, which are shown only for purposes of illustration) to provide a gas flow at the entrance to the combustor which is a thorough mixture of the products of combustion from the fire and primary air oxygen which has been warmed by its passage along the front of the stove and the swirling action induced by plate 40. The result is the delivery to the combustor of a thoroughly mixed and warm gas stream which has a high content of combustible material and an adequate supply of heated but unburned oxygen whereby catalytically induced combustion immediately occurs in the combustor to burn substantially all of the unburned combustion products.

It is significant to note that with the structure of the present invention, light-off or ignition of the combustor occurs almost immediately upon the ignition of fire in the firebox and occurs at relatively low temperatures of the combustion gases (such as on the order of 600° F.) encountered in normal primary combustion in the firebox and, most significantly, without direct flame impingement on the combustor. Indeed, for reasons not fully understood, with the construction shown, direct flame impingement (i.e., the flame being drawn or sucked into the combustor) does not occur. It is also important to note that with the structure of the present invention there is no need for secondary airflow to the combustor. Generally, prior art catalytic combustor structures have required a secondary airflow to the catalytic combustor; and this secondary airflow has actually created problems for proper operation of the combustor. The secondary airflow is cool, while the combustor normally requires high temperatures to operate, and the secondary airflow may result in oxygen rich quenching of the combustor operation.

While it is recognized that the structure of the present invention is relatively simple, the simple structure produced significantly unexpected results in a synergistic combination. The combustor ignitor plate 40 cooperates with the combustor 32 to produce a synergistic effect whereby the combustor may be lit off and maintained in continuous operation throughout normal burning operation of the stove at relatively low temperatures of normal combustion and without direct flame impingement on the combustor. Furthermore, while it is not known whether the air supply manifold structure 36 is essential to the operation of the device or whether other primary air supply systems may be used, the air supply manifold structure is known to also contribute to the synergistic effects to produce essentially complete combustion. Tests have shown that with the use of the air supply manifold, air and combustion gas mixing occurs so thoroughly in the firebox that a standing flame may be created immediately behind the front door in a part of air stream 51 which constitutes, in effect, a secondary burn of the combustion gases.

Tests have also shown the synergistic result that main airflow and combustion can be reduced while increasing the catalytic combustor operation and temperature. Thus, in one such test, the drafts 38 were first operated essentially fully open to produce maximum airflow to the wood load in the firebox. In that situation, the wood burned with a vigorous flame (which, however, did not get drawn or sucked up into combustor 32), and the combustor also lit off indicating the occurrence of catalytic combustion. In this first instance, firebox internal temperature was in the range of 600°–700° F., the catalytic combustor temperature was about 1000° F., and the exhaust stack temperature was about 350° F. Then, drafts 38 were closed down to reduce the primary airflow to about 25% of its original value. In this second instance, the flame in the firebox died way down (almost, but not completely extinguishing). The wood then smoldered and generated large amounts of smoke (containing large amounts of unburned combustion products) which were delivered to combustor 32. The combustor 32 not only continued to operate, but its temperature rose significantly to the range of 1200° F. (thus indicating increased burning in the combustor), while the firebox temperature was reduced to the range of about 400° F. and the stack temperature was reduced to about 200° F. Therefore, with reduced airflow, more heat was generated from the catalytic combustor while at the same time the rate of consumption of fuel (wood) was reduced. This was achieved by the more efficient burning of combustion products in the catalytic combustor realized by the present invention.

To establish the synergistic effects of the combustor ignitor plate 40 (which causes the combustor to light off and continue operation without direct flame impingement), plate 40 was removed, and the stove operated. However, without plate 40 present, the catalytic combustor 32 would not light off without direct flame impingement.

The ability to operate the catalytic combustor at high efficiency and without direct flame impingement means that the operating life of the catalytic combustorn can be greatly extended, thus making the catalytic combustor useful in a practical an economical sense for the first time.

While preferred embodiments have been shown and described, various modifications and substitutions may be made thereto without departing from the spirit and scope of the invention. Accordingly, it is to be understood that the present invention has been described by way of illustration and not limitation.

What is claimed is:
1. A stove including:
a firebox for holding and burning a load of fuel;
air inlet means for delivering a primary air supply to said firebox for combustion;

exhaust means for the discharge of gases from said firebox;

catalytic combustor means in said firebox for combustion of gaseous products emanating from the fuel, said catalytic combustor means having an entrance in fluid communication with the interior of said firebox and a discharge in fluid communication with said exhaust means; and combustor ignitor plate means mounted in said firebox to produce a mixed gas of said gaseous products and at least part of said primary air supply for delivery to the entrance to said catalytic combustor means and to effect ignition of said catalytic combustor means, said combustor ignitor plate means being inclined at an angle to the axis of said catalytic combustor means and defining a plurality of zones of turbulence or mixing.

2. The stove of claim 1 wherein:
said combustor ignitor plate means projects into the path of said primary air supply and overlaps at least part of the entrance to said catalytic combustor means.

3. The stove of claim 1 wherein:
said combustor ignitor plate means cooperates with the walls of said firebox to define a turbulence or mixing zone above said combustor ignitor plate means.

4. The stove of claim 3 including:
airflow passage means for the delivery of primary air to said zone above said combustor ignitor plate means.

5. The stove of claim 1 wherein:
ignition of said catalytic combustor means is effected without flame impingement on said catalytic combustor means.

6. The stove of claim 1 wherein:
said combustor ignitor plate means projects into the path of said primary air supply and overlaps at least part of the entrance of said catalytic combustor means to prevent direct flow of the primary air to said catalytic combustor means., 7. A stove including:
a firebox for holding and burning a load of fuel;
air inlet means for delivering a primary air supply to said firebox for combustion, said inlet means including manifold means for receiving ambient air and delivering a distributed air supply to said firebox;
exhaust means for the discharge of gases from said firebox;
catalytic combustor means in said firebox for combustion of gaseous products emanating from the fuel, said catalytic combustor means having an entrance in fluid communication with the interior of said firebox and a discharge in fluid communication with said exhaust means; and
combustor ignitor plate means mounted in said firebox to produce a mixed gas of said gaseous products and at least part of said primary air supply for delivery to the entrance to said catalytic combustor means and to effect ignition of said catalytic combustor means, said combustor ignitor plate means being inclined at an angle to the axis of said catalytic combustor means and defining a plurality of zones of turbulence of mixing.

8. The stove of claim 7 wherein:
said combustor ignitor plate means projects into the path of said primary air supply and overlaps at least part of the entrance to said catalytic combustor means.

9. The stove of claim 7 wherein:
said combustor ignitor plate means cooperates with the walls of said firebox to define a turbulence or mixing zone above said combustor ignitor plate means.

10. The stove of claim 9 including:
airflow passage means for the delivery of primary air to said zone above said combustor ignitor plate means.

11. The stove of claim 7 wherein:
ignition of said catalytic combustor is effected without flame impingement on said combustor means.

12. The stove of claim 7 wherein:
said combustor ignitor plate means projects into the path of said primary air supply and overlaps at least part of the entrance to said catalytic combustor means to prevent direct flow of the primary air to said catalytic combustor means.

13. A stove including:
a firebox for holding and burning a load of fuel, said firebox having front and back walls and side walls;
air inlet means for delivering a primary air supply to said firebox for combustion, said air supply being delivered along one of said walls;
exhaust means for the discharge of gases from said firebox;
catalytic combustor means in said firebox for combustion of gaseous products emanating from the fuel, said combustor being adjacent said one wall and said catalytic combustor means having an entrance in fluid communication with the interior of said firebox and a discharge in fluid communication with said exhaust means; and
combustor ignitor plate means mounted in said firebox to produce a mixed gas of said gaseous products and at least part of said primary air supply for delivery to the entrance to said catalytic combustor means and to effect ignition of said catalytic combustor means, said combustor ignitor plate means being inclined at an angle to the axis of said catalytic combustor means and defining a plurality of zones of turbulence or mixing.

14. The stove of claim 13 wherein:
said combustor ignitor plate means is adjacent said one wall and projects into the path of said primary air supply and overlaps at least part of the entrance to said catalytic combustor means.

15. The stove of claim 13 wherein:
said combustor ignitor plate means cooperates with the walls of said firebox to define a turbulence or mixing zone above said combustor ignitor plate means and is spaced from said one wall to define an airflow passage into said zone.

16. The stove of claim 13 including:
airflow passage means for the delivery of primary air to said zone above said combustor ignitor plate means.

17. The stove of claim 13 wherein:
ignition of said catalytic combustor means is effected without flame impingement on said catalytic combustor means.

18. The stove of claim 13 wherein:
said combustor ignitor plate means projects into the path of said primary air supply and overlaps at least part of the entrance to said catalytic combustor means to prevent direct flow of the primary air to said catalytic combustor means.

* * * * *